April 30, 1968      R. R. HOLBROOK      3,380,149
METHOD OF AND APPARATUS FOR ASSEMBLING ODOMETER
Original Filed April 9, 1964      4 Sheets-Sheet 1
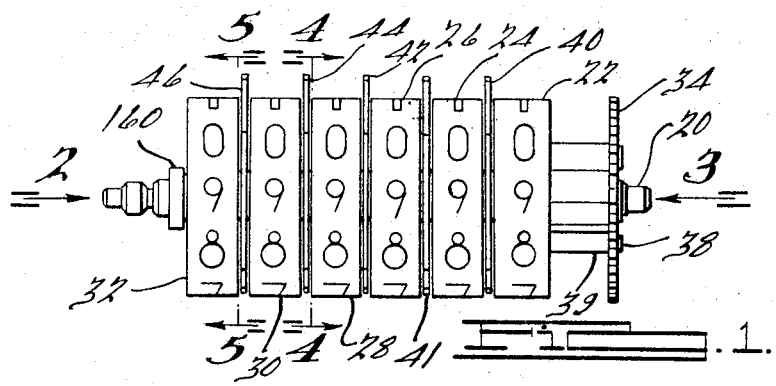
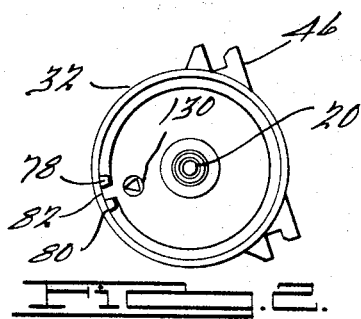
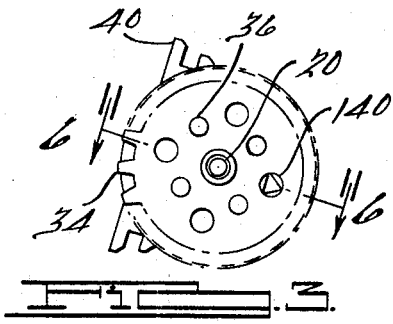
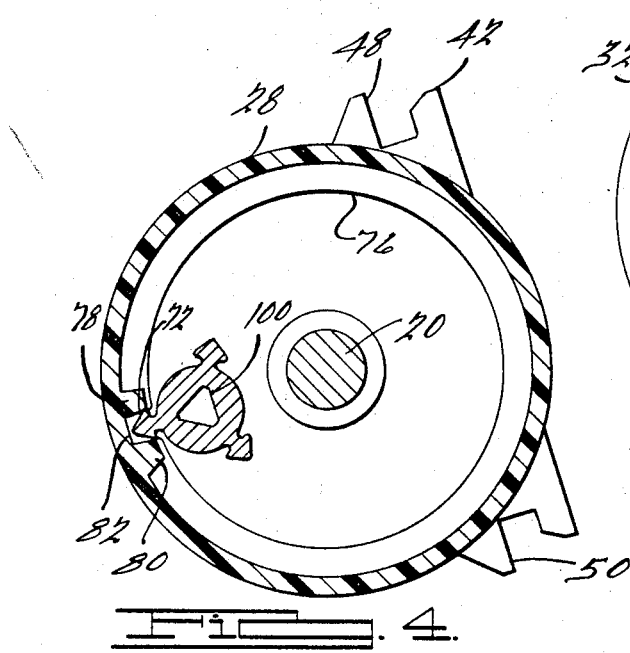
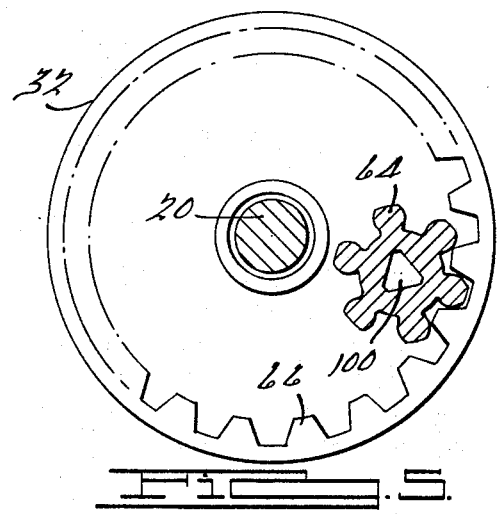
INVENTOR.
Rex R. Holbrook.
BY
Harness, Dickey & Pierce
ATTORNEYS April 30, 1968     R. R. HOLBROOK     3,380,149
METHOD OF AND APPARATUS FOR ASSEMBLING ODOMETER
Original Filed April 9, 1964     4 Sheets-Sheet 2
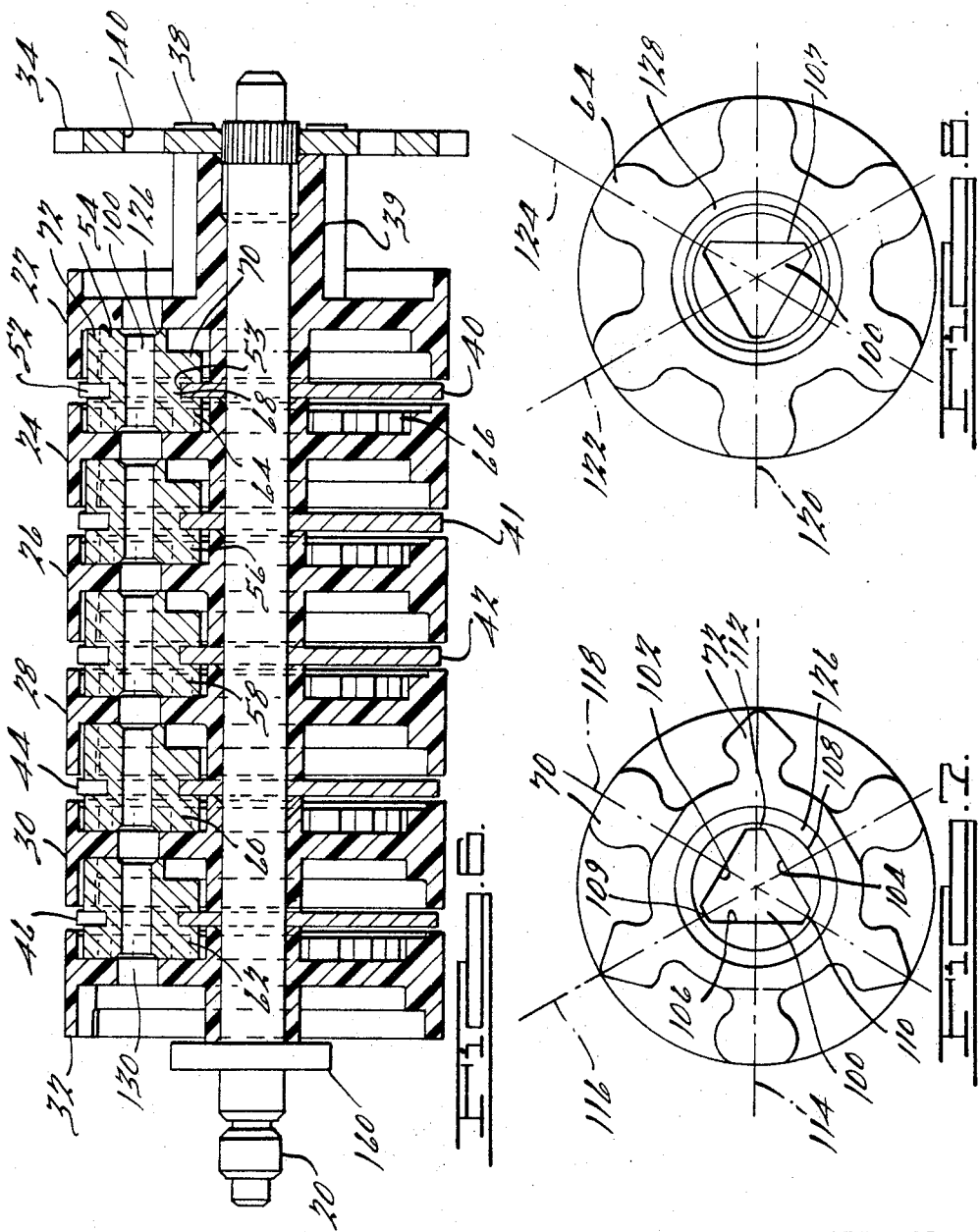
INVENTOR.
Rex R. Holbrook.
BY
Harness, Dickey & Pierce
ATTORNEYS April 30, 1968     R. R. HOLBROOK     3,380,149
METHOD OF AND APPARATUS FOR ASSEMBLING ODOMETER
Original Filed April 9, 1964     4 Sheets-Sheet 3
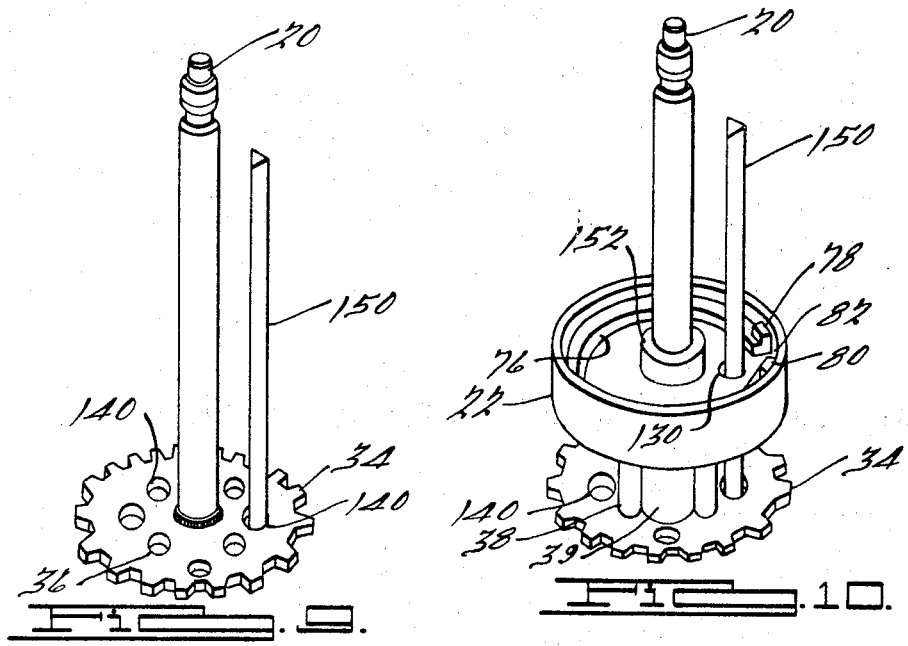
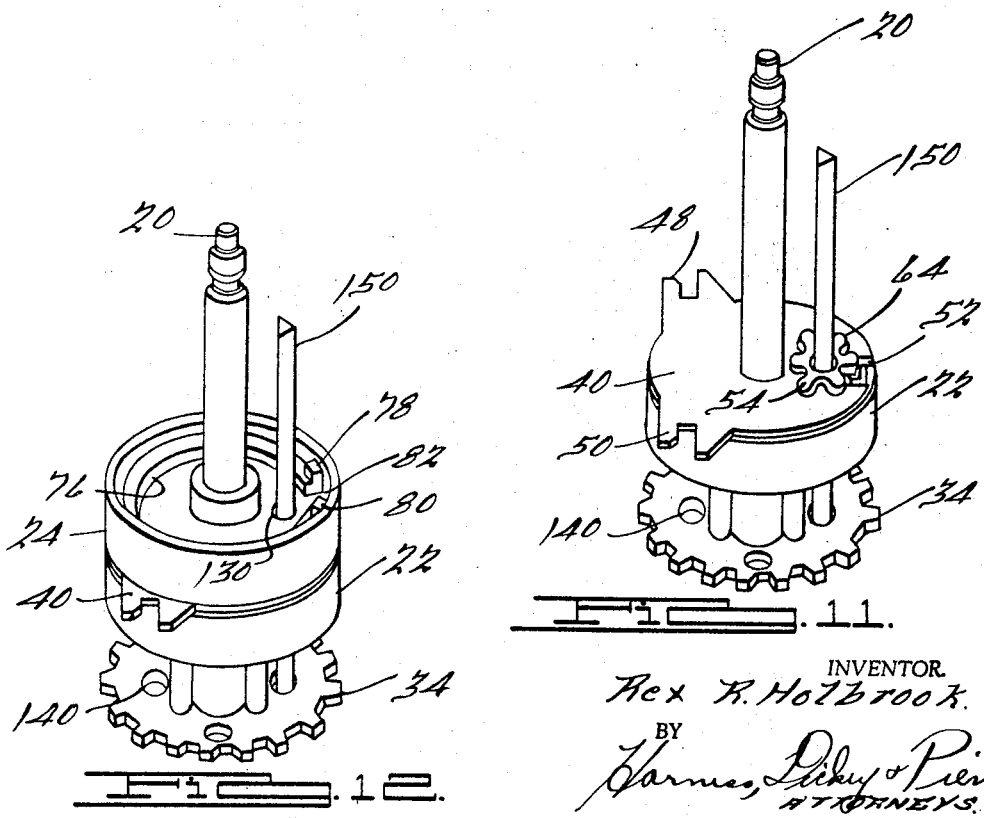
INVENTOR.
Rex R. Holbrook.
BY
Harness, Dickey & Pierce.
ATTORNEYS.

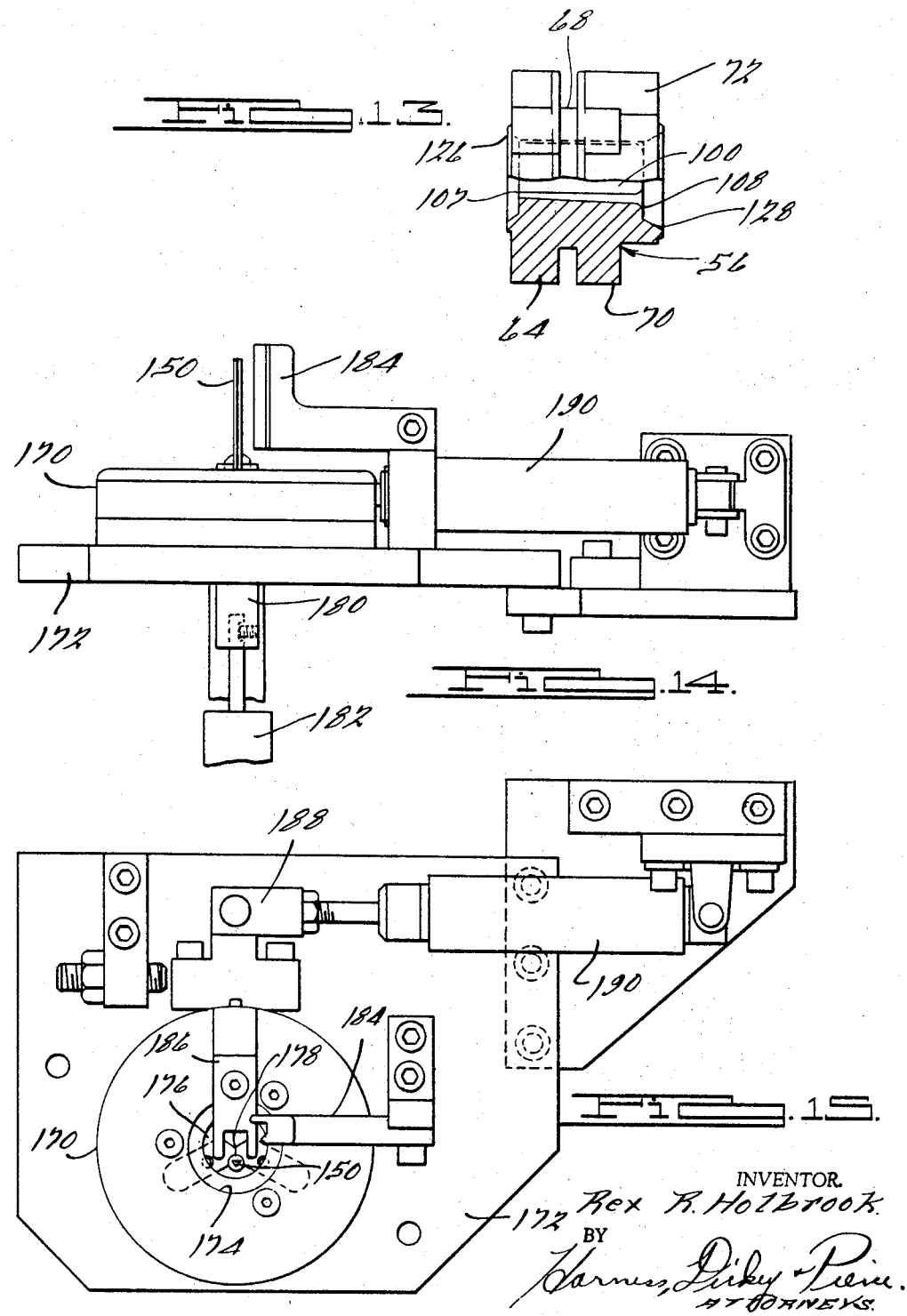

United States Patent Office 3,380,149
Patented Apr. 30, 1968

3,380,149
METHOD OF AND APPARATUS FOR ASSEMBLING ODOMETER
Rex R. Holbrook, Ann Arbor, Mich., assignor to King-Seeley Thermos Co., Ann Arbor, Mich., a corporation of Michigan
Original application Apr. 9, 1964, Ser. No. 358,494. Divided and this application Dec. 27, 1965, Ser. No. 560,988
6 Claims. (Cl. 29—464)

This invention relates to odometers and more particularly to assembly means therefor, and is a divisional of my copending application Ser. No. 358,494, filed Apr. 9, 1964, now abandoned.

Odometers of the type to which this invention relates are well known and have been utilized by the automotive industry and others for a number of years. The general details of construction and operation are disclosed in such United States patents as, for example: Berge 1,482,596, Feb. 5, 1924; Dinsmore 1,692,489, Nov. 20, 1928; Zubaty 1,919,493, July 25, 1933; and Helgeby et al. 2,117,024, May 10, 1938.

Odometer devices of the type to which this invention relates comprise a plurality of indicating rolls each of which has numerals from zero to nine equally spaced about the periphery. Each of the rolls is suitably connected to the next adjacent roll by a transfer mechanism which causes a predetermined amount of rotation of the next adjacent roll dependent upon the amount of rotation previously imparted to the preceding roll. During assembly, certain predetermined relationships must be established between the roll and the transfer mechanism in order to obtain the desired movement therebetween. Furthermore, it is desirable to obtain an initial zero condition with like numerals on the adjacent rolls aligned and having a predetermined orientation.

Consistent establishment of the aforementioned relationships during assembly has been a problem for the manufacturers of odometers for over fifty years. In general in the prior art, odometers have been assembled more or less by manual operations. Alignment and positioning of the various parts have been the responsibility of the individual worker making the assembly. The parts of the odometer, particularly the transfer mechanism, are relatively quite small and great difficulty has been encountered in handling the devices and placing them in the desired positions. In the past, it has been common experience to find completely assembled odometers improperly assembled upon final inspection, such improper assembly being due solely to the misplacement of a single small transfer pinion only one tooth space within the odometer assembly. Such errors in assembly are not readily apparent by visual inspection either at the time of assembly or upon completion of the odometer assembly whereupon the internal transfer mechanism is hidden from view. The error in assembly, however, is readily apparent upon subsequent operation of the device when the device malfunctions. Needless to say, such assembly problems have caused great consternation in the odometer manufacturing industry.

Accordingly, it is a primary object of the present invention to provide new and improved methods and apparatus for assembling odometers.

Another primary object of the present invention is to provide a new and improved odometer having improved assembly features assuring accurate assembly of the various odometer components.

Another object of the present invention is to provide new and improved means of assembling an odometer which will facilitate accuracy in assembly as well as reduce the time required for assembly.

The inventive principles by which the aforementioned objects, and others, have been attained are hereinafter described in detail by reference to the accompanying drawing, in which:

FIGURE 1 is a side elevational view of an assembled odometer illustratively embodying the invention;

FIGURE 2 is an end view of the apparatus shown in FIGURE 1;

FIGURE 3 is another end view of the apparatus shown in FIGURE 1;

FIGURE 4 is a sectional view taken along the line 4—4 in FIGURE 1;

FIGURE 5 is a sectional view taken along the line 5—5 in FIGURE 1;

FIGURE 6 is a cross sectional view taken along the line 6—6 in FIGURE 3;

FIGURE 7 is an enlarged detail view of a portion of the apparatus shown in FIGURE 6;

FIGURE 8 is an enlarged side elevational view of the apparatus shown in FIGURE 7;

FIGURE 9 is a perspective view of a portion of the apparatus shown in FIGURE 1 at an initial stage of assembly;

FIGURE 10 is a perspective view of a portion of the apparatus shown in FIGURE 1 at an intermediate stage of assembly;

FIGURE 11 is another perspective view of a portion of the apparatus shown in FIGURE 1 in another subsequent assembly condition;

FIGURE 12 is another perspective view of a further assembly condition of the apparatus shown in FIGURE 1;

FIGURE 13 is an enlarged detail view, partly in section, of a portion of the apparatus shown in FIGURE 1;

FIGURE 14 is a side elevational view of a portion of an assembly fixture which may be utilized to assemble the odometer shown in FIGURE 1; and FIGURE 15 is a plan view of the apparatus shown in FIGURE 14.

Referring now to FIGURE 1, a six roll odometer assembly of generally conventional design is shown to comprise an odometer shaft 20 upon which a tenth mile roll 22, a mile roll 24, a ten mile roll 26, a hundred mile roll 28, a thousand mile roll 30, and a ten thousand mile roll 32 are rotatably supported. Each of the rolls is provided with suitable spaced numerals around its periphery from, for example, zero to nine. After completion of assembly and prior to installation in a vehicle or the like the rows of numerals are aligned as shown.

A mile gear 34 is mounted on one end of the odometer shaft 20 and, as shown in FIGURE 3, is provided with a plurality of drive shaft apertures 36 which are adapted to receive drive shaft means 38 in the form of stub shafts integrally formed on the end of a hub 39 connected to the tenth mile indicating roll 22. In the illustrative embodiment, there are four such stub shafts and corresponding shaft apertures located in spaced relationship around the periphery of the mile gear 34 approximately 90° apart. Gear 34 is supported by suitable fastening means in abutting engagement with the adjacent end surface of hub 39.

Each of the rolls is separated from the adjacent roll or rolls by partition plate means 40, 41, 42, 44, 46. As shown in detail in FIGURE 4, each partition plate is provided with notched support flange means 48, 50 which are aligned with one another throughout the length of the odometer and provide means for supporting the odometer in assembled position with an automobile speedometer or the like. A radially extending slot 52, shown in FIGURE 11, is located centrally between the flange portions 48, 50. The bottom of the slot 52 is rounded to provide a bearing seat 53, FIGURE 6, for a transfer pinion 54. Identical transfer pinions 56, 58, 60, 62 are provided in alignment along the length of the odometer assembly between adjacent rolls. Each pinion comprises a toothed portion 64 having regular equally spaced teeth members engaged with internal teeth 66 in the adjacent portion of the next roll as shown in FIGURE 5. A central cylindrical portion 68, FIGURES 6 and 13, of reduced diameter is rotatably supported on the curved bearing seat 53. The other end of the pinion is provided with a special arrangement of drive teeth 70 and locking teeth 72.

Referring now to FIGURES 4 and 10, each roll is provided with an internally located locking rim 76 and a pair of teeth 78, 80 separated by a gap 82 which extends inwardly into and through the locking ring 76. Teeth 78, 80 have a particular alignment relative to the indicia on the rolls and each set of teeth on each roll may, for example, be radially aligned with the numeral zero.

In order for the transfer mechanism to function properly, the pinion must be assembled in the condition shown in FIGURE 4 with one of the locking teeth 72 located in engagement between the internal teeth 78, 80 and with one of the working teeth 78 positioned on either side of the teeth 78, 80 for rotatable driving engagement therewith.

To acquire the desired relationship between the pinion and the internal teeth 78, 80 without fail and without the necessity for relying on visual inspection of each and every pinion assembly by the workmen, assembling means are integrally provided on each pinion. Furthermore, the entire odometer assembly incorporates assembly means facilitating assembly of the pinions in proper relationship with the rolls and of the rolls relative to one another. In order to facilitate automatic assembly without the necessity for manual dexterity and visual inspection, each of the pinions is provided with an assembly means which insures that the proper position will be attained each and every time.

The assembly means, illustratively, comprises a centrally located aperture 100 which extends completely through the pinion from end to end parallel to the central axis of rotation. Referring now to FIGURES 7, 8 and 13, aperture 100 is generally triangular in cross section and is defined by three intersecting side surfaces 102, 104, 106. In the preferred embodiment, as shown in FIGURE 13, the opening at one end 107 of the aperture is substantially triangular in cross section but the opening at the other end 108 is substantially circular in cross section. The diameter of the circular opening 108 is substantially larger than the altitude of the triangular opening 107 and the connecting interior wall portions are correspondingly tapered. The intersections of the guide surfaces are formed by obliquely extending wall portions 109, 110, 112. Bisectors 114, 116, 118 of each of the angles are aligned with the tooth portions 70, 72 as shown in FIGURE 7. The apex of each angle is aligned with the locking tooth portions 72 so that, if one of the apices points toward the gap 82 between teeth 78, 80 on the roll, a locking tooth 72 will be positioned in the gap 82. Similarly, bisectors 120, 122, 124 of the angles of the triangular aperture are also aligned with the tooth portions 64 on the other side of the pinion as shown in FIGURE 8. Tapered guide openings 126, 128, are provided at each end of the assembly aperture 100.

Each of the rolls 22–32 are provided with a single guide aperture 130, FIGURES 2 and 10, which is located immediately opposite the internal teeth 78, 80.

Drive gear 34 is provided with a plurality of guide apertures 140, FIGURE 3, there being four in the preferred embodiment located in equally spaced relationship at 90° relative to the shaft apertures 36. By providing four apertures 140, the initial relationship of the tenth roller 22 relative to the drive gear 34 is not critical and the stub shafts 38 may be positioned in any of the holes 36, at least one of the guide holes 140 being aligned with the guide holes 130 in the rolls.

*Assembly operation sequence*

In order to achieve the assembled relationships shown in FIGURES 1 and 6 with all of the assembly apertures 130 in the rolls aligned from end to end of the assembly with each of the assembly apertures 100 in the pinions and with one of the assembly apertures 140 in the drive gear 34, the sequence of assembly shown in FIGURES 9–11 is preferably utilized. To obtain the desired relationship between the pinions locking teeth 72 and working teeth 70 relative to the internal teeth 78, 80 on the rolls, a triangularly shaped assembly tool 150 is utilized. Tool 150 has a cross-sectional shape and size substantially corresponding to the triangular opening 107 of assembly aperture 100 in each of the pinions and may have a tapered tip facilitating insertion through circular opening 108. Of course, the assembly holes 130, 140 are sufficiently oversized to permit ready insertion of the assembly tool therethrough.

Referring now to FIGURE 9, the odometer shaft 20 and drive gear 34 are shown to be an integral assembly. The first step of the assembly operation comprises insertion of the assembly tool 150 through one of the assembly apertures 140 which also serves to establish the desired relationship between the stub shafts 38 and the drive shaft apertures 36.

The next assembly step, FIGURE 10, comprises positioning the tenth roll 22 over the odometer shaft 20 with the hub 39 extending toward the drive gear 34. The centrally apertured hub portions 39, 152 of the roll 22 are positioned on the end of the odometer shaft 20 and the assembly hole 130 is aligned with the assembly tool 150. After the shaft 20 and tool 150 are positioned in their respective apertures in the roll, roll 22 is slid axially along the shaft 20 until the stub shafts 38 are received within the apertures 36 and hub 39 is seated on gear 34. The relationship of the assembly aperture 130 to the stub shaft extensions 38 and the apertures 36 is such that the stub shafts are immediately received within the holes 36 without further manipulation.

The next step in the operation comprises association of one of the pinions with one of the partitioned plates. The pinion is slid into rotatably supported position with the cylindrical portion 68 within the slot 52 on the bearing seat 53. Then the subassembly of the partitioned plate and the pinion are brought into alignment with the ends of shaft 20 and the tool 150. A central aperture on the partitioned plate is positioned on the shaft 20 and the subassembly is slid axially toward the tool 150. As the pinion approaches the tool 150, the tapered end of the tool enters the tapered portion 128 of the pinion and then the aperture 100 through the circular opening 108. As the tool approaches the triangular opening 107, the pinion is rotated until the triangular aperture 100 is aligned with the triangular assembly tool 150. The partitioned plate and pinion are then slid into abutting engagement with the roll 22 as shown in FIGURE 11. The alignment attained by association of the pinion with the tool locates one of the locking teeth 72 directly in line with the slot 82 and proper meshing engagement of working teeth 70 with the teeth 78, 80 is immediately effected.

The next step in the operation comprises positioning the central aperture of the next roll 24 in alignment with the shaft 20 and the assembly aperture 130 in alignment with the tool 150. The roll is associated with both the shaft and the tool and slid axially into position. FIGURE 12, against the partition plate 40 with the teeth 64 of the pinion 54 in meshing engagement with the internal teeth 66 on roll 24.

The subsequent assembly procedure of the other rolls, partition plates, and pinions is identical to that described in relation to the roll 22, partition plate 40 and the pinion 54. Each succeeding roll and pinion will be identically aligned and positioned with the numerals in alignment as shown in FIGURE 1. After the last roll has been assembled, suitable locking means 160 are associated with the end of the odometer shaft 20 to secure the parts in assembled position. Assembly tool 150 may then be withdrawn and the odometer assembly is ready for installation.

It will be appreciated by those skilled in the art to which this invention relates that the aforedescribed methods may be readily adapted to provide semi-automatic and automatic assembly fixtures for carrying out the aforedescribed steps. For example, as shown in FIGURES 14 and 15, such an assembling fixture may illustratively comprise a supporting head 170 mounted on a base plate 172 which may be fixedly supported in any suitable manner. Head 170 includes a recessed annular seat 174 for receiving the drive gear 34-shaft 20 subassembly. Suitable jaw means 176 are provided to clampingly engage the lower end of odometer shaft 20 at 178. Tool 150 may be slidably mounted in suitable guide means extending vertically through the head 170 and plate 172. Suitable coupling means 180 connect tool 150 to a power operable cylinder 182 for extending and retracting the tool. A roll guide bracket 184 may be mounted adjacent the tool 150.

Clamping means for securing the last roll on the top of the odometer and applying the fastening means 160 may be provided by a suitable clamping head (not shown) mounted above the end of the tool 150 and bracket 184. Suitable ejection mechanism 186 for removing the assembled odometer may be operably connected to the jaw actuating linkage 188. A power cylinder 190 is connected to the linkage 188 to move the jaw means and ejection means between extended and retracted positions.

In operation, a gear and shaft subassembly is loaded on the fixture with the drive gear 34 being received on the seat 174. The air cylinder 190 is actuated to move the jaw means into clamping engagement with the end of the shaft 120. The triangular assembly tool 150 extends upwardly through one of the assembly holes 140 in the gear. A tenth roll 22 is loaded over the odometer shaft 20 onto the triangular tool and the stub shafts 38 are positioned in the apertures 36. A transfer pinion 54 is assembled to a partition plate 40 and similarly loaded over the odometer shaft and onto the loading tool. The loading tool automatically aligns a locking tooth 72 of each pinion with the locking ring notch 82 in the adjacent odometer roll. Subsequently, the total rolls 24, 26, 28, 30, 32 are similarly assembled over the odometer shaft and onto the assembly tool with each roll being separated by a partition plate and transfer pin assembly. Finally, the assembly washer 160 is fitted over the end of the odometer shaft and a suitable fixture is brought into alignment with the top of the assembly and is actuated to press the washer into place. At this time the air cylinders 182, 190 are actuated to retract the tool 150 and the jaw means whereupon the completed assembly may be unloaded.

It is contemplated that certain of the inventive principles, hereinbefore disclosed in detail by reference to a presently preferred embodiment of the invention, may be otherwise variously embodied and therefore it is intended that the scope of the appended claims be construed to include those modifications and changes which employ the inventive principles.

The invention claimed is:
1. The method of assembly of an odometer comprising the steps of mounting a plurality of rolls on a common shaft one roll at a time, interconnecting each roll by drive means, mounting said drive means on a common alignment shaft one by one between each of said rolls, and removing said common alignment shaft for said drive means after all of said rolls have been mounted.

2. Means for establishing a predetermined relationship between relatively rotatable elements of an odometer or the like, comprising an elongated assembly tool having a length sufficient to simultaneously extend through all of said rotatable elements, said assembly tool having a particular cross-sectional configuration, said rotatable elements each having an aperture of corresponding cross-sectional configuration by which said rotatable elements may be mounted on said assembly tool, the aperture on each rotatable element having a particular relationship relative to the rotatable element sufficient to establish the predetermined relationship by simply associating said assembly and said rotatable element.

3. The method of assembling an odometer comprising forming a subassembly of a drive gear and an odometer shaft, associating an assembly tool in parallel spaced relationship with the odometer shaft, forming a subassembly of a partition plate and a transfer pinion for placement between each odometer roll, mounting each odometer roll on both the odometer shaft and the assembly tool, mounting a subassembly of a partition plate and a transfer pinion on both the odometer shaft and the assembly tool between each roll, and subsequently removing the assembly tool and securing the odometer parts in position on the odometer shaft.

4. Apparatus for assembling an odometer comprising seat means for the drive gear, jaw means for engaging the odometer shaft and holding the drive gear on the seat means, an extensible and retractible assembly tool located in alignment with said seat means, guide means slidably supporting said assembly tool, and actuating means connected to said assembly tool for moving said assembly tool between a retracted position within said seat means and an extended position located in parallel spaced relationship relative to the odometer shaft.

5. The invention as defined in claim 4 and having guide means extending parallel to said odometer shaft and said assembly tool for supporting engagement with the odometer components during assembly.

6. The invention as defined in claim 4 and having fastening means operable to secure assembled odometer parts on the odometer shaft.

References Cited
UNITED STATES PATENTS
1,463,269   7/1923   Johnson _____ 29—464

WILLIAM I. BROOKS, *Primary Examiner.*